United States Patent [19]
Ernst et al.

[11] 3,861,270
[45] Jan. 21, 1975

[54] STRADDLING DOWEL
[75] Inventors: Urs Ernst, Vaduz; Beda Meier, Schaanwald, both of Liechtenstein
[73] Assignee: Palar (Curacao) N.V., Netherlands, Antilles
[22] Filed: Sept. 28, 1972
[21] Appl. No.: 293,064

[30] Foreign Application Priority Data
Oct. 22, 1971  Germany............................ 2152729

[52] U.S. Cl. ................................................... 85/84
[51] Int. Cl. ........................................... F16b 13/06
[58] Field of Search............................ 85/82, 83, 84

[56]  References Cited
UNITED STATES PATENTS
| | | | |
|---|---|---|---|
| 1,000,715 | 8/1911 | Caywood | 85/83 |
| 2,616,328 | 11/1952 | Kingsmore | 85/83 |
| 3,042,961 | 7/1962 | Tieri | 85/82 |
| 3,638,259 | 2/1972 | Eibes et al. | 85/84 |

FOREIGN PATENTS OR APPLICATIONS
884,090    7/1957    Germany ................................. 85/84

Primary Examiner—Edward C. Allen
Attorney, Agent, or Firm—Toren and McGeady

[57] ABSTRACT

A straddling dowel is formed of a metal sleeve having a continuous bore from its trailing end to its leading end. Axially extending slots are formed in the sleeve for a portion of its axial length extending from the leading end. Within the sleeve an axially extending portion of its bore surface, extending from the leading end, is tapered in diverging relationship toward the trailing end. The outer surface of the sleeve is free of grooves in the spreading range and a portion of the outer surface in the spreading range, extending axially from the leading end, is tapered. At the trailing end of the sleeve, its outer surface has a frusto-conical shape widening toward the trailing end. A member is insertable into the bore of the sleeve for spreading it and the spreading member has a frusto-conically shaped portion directed toward the leading end of the bore.

4 Claims, 1 Drawing Figure

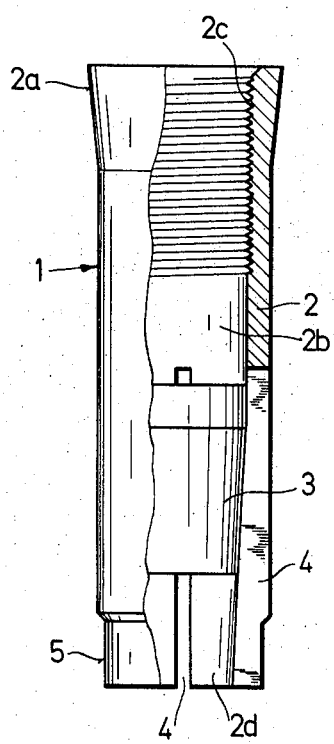

STRADDLING DOWEL

SUMMARY OF THE INVENTION

The present invention is directed to a straddling dowel containing a female thread and, more particularly, it concerns the configuration of the inside and outside surfaces of a metal sleeve forming the dowel and of a spreader which can be driven into the leading end of the bore through the sleeve.

Presently known straddling dowels have various shortcomings which result in an adverse effect on the anchoring ability of the dowel.

Straddling dowels are known which have differently formed radial ribs on the outer surface of the dowel within its spreading range. When the dowel is spread by driving a spreader through its bore, the radial ribs cause stress peaks in the hole in the receiving material into which the dowel is inserted, for example, in concrete or rock, so that the receiving material collapses in the spreading range of the dowel due to the forces acting on it and causes the material surrounding the hole to become pulverized into a powdered form. The pulverized material surrounding the dowel in its spreading range has the result that a form-closure between the outer surface of the dowel and the material of the borehole cannot be formed. Further, there is insufficient friction contact between the outer surface of the dowel and the surface of the borehole because of the intermediate pulverized or powdered layer.

Furthermore, known dowels of the type mentioned above have the characteristic that, in the spreading range, such a dowel widens more at its leading end with the result that the outside diameter widens conically toward the leading end of the dowel when the spreader is driven completely into the bore through the dowel. As a result of this construction, considerable stress peaks develop in the leading end of the dowel and such stress peaks tend to cause extensive crumbling of the receiving material, while the rearward portion of the spreading range provides little, if any, supporting or gripping function.

Moreover, the presently known dowels have the disadvantage that spreading takes place only in the region in which the forces developed by the spreader act radially toward the surface of the borehole into which the dowel is inserted. As a result, compared to the remaining axial length of the dowel, its leading end becomes bent due to the resistance of the borehole to the spreading action prior to the spreader coming into operative contact with the leading end, so that the cone angle of the bore within the dowel becomes increasingly obtuse towards its leading end.

As the spreader continues to be driven into the bore in the dowel, the cone angle becomes increasingly obtuse and the dowel bore becomes so narrow that any further advance of the spreader is prevented. When this occurs, there is the disadvantage that the dowel is not spread completely into contact with the borehole and the desired anchoring action cannot be attained.

Therefore, it is the primary object of the present invention to avoid the disadvantages experienced in prior straddling dowels and to provide higher anchoring values than had been achieved in the past.

In accordance with the present invention, the problems experienced in the past are overcome by the following features:

By conically tapering the dowel bore at its leading end;

By maintaining the outer surface of the dowel free of grooves, that is, providing it with a smooth surface, in its spreading range; and By providing the spreader with a frusto-conical configuration so that it tapers inwardly toward its leading end.

Due to the similar conically tapering configuration of the leading end of the dowel bore and of the spreader, the spreading action, as the spreader is driven through the bore toward the leading end of the dowel, takes place substantially parallel to the dowel axis.

This spreading action has the additional advantage that in its entire spreading range, the dowel bears on the surface of the borehole and a cylindrically shaped bearing surface with uniform load distribution is attained.

Further, the smooth surface on the exterior of the dowel contributes considerably to the uniform load distribution, since no local stress peaks are developed. By avoiding such stress peaks, the crumbling of the receiving material forming the borehole surrounding the dowel is not pulverized and reduced to a powdered form. Accordingly, excellent friction contact is obtained between the dowel and its borehole and without any loose material between the two it is possible to achieve extremely high anchoring forces.

To prevent any bending of the leading end of the dowel before the spreader comes in contact with it, preferably the dowel sleeve is tapered at its leading end relative to the remainder of the dowel part trailing the leading end within its spreading region. The tapering of the exterior of the dowel sleeve at its leading end can be provided in the form of a recess of reduced diameter or in the form of a frusto-conically shaped section on the exterior leading end of the sleeve. The axial length of the tapered portion on the exterior of the dowel sleeve is preferably not greater than that length of the dowel region which extends forwardly of the leading end of the spreader when the spreader is fitted into the conically shaped portion within the dowel bore but before it commences to be driven toward the leading end of the dowel. The least diameter of the tapered portion on the exterior of the dowel is preferably selected so that it is not widened more than to the diameter of the borehole upon the completion of the spreading action. The same effect, that is the unhindered advance of the spreader, can also be achieved by introducing a ring into the bottom of the borehole which ring has a diameter corresponding to the diameter of the borehole and whose axial length corresponds substantially to the axial length of the tapered portion formed on the exterior leading end of the dowel. With such an arrangement, however, the dowel length would have to be shorter by the axial length of the ring as compared to the length of the dowel described above. The dowel embodiment using the ring positioned in the bottom of the dowel borehole has the advantage over the other embodiment described above in that the taper on the exterior leading end of the dowel can be eliminated and, as a result, the production costs of the dowel reduced. To assure that the dowel is firmly held even under transverse loads, the trailing region of the dowel is preferably provided with a conically expanding exterior surface at the trailing end. In such an arrangement the dowel is securely anchored within the bottom of the borehole and at the entrance to the borehole and this arrangement is particularly advantageous in bores where the diameter has a tendency to increase due to the driving action or where the bore may be out of round.

The driving of the spreader through the bore of the dowel can be facilitated if the spreader is covered with a lubricating coat. A suitable substance for the lubricating coat would be Tectyl. Excellent test results have been achieved both with Tectyl used as an undercoat protection for motor vehicles and with Tectyl used as rust-proofing oils. These preferred products, however, do not exclude the use of materials other than Tectyls. Furthermore, all types of oils which have a rust-proofing property can be used as the lubricating coat. Additionally, the lubricating effect can be achieved with certain suitable material combinations, for example, with a coating on the spreader of a white metal or by forming the spreader from grey cast iron, where the graphite incorporated in the grey cast iron acts as a lubricant.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

A side view, partly in section, is shown of a straddling dowel embodying the present invention.

DETAILED DESCRIPTION OF THE INVENTION

In the drawing a straddling dowel 1 is illustrated consisting of an axially elongated metal dowel sleeve 2 and a spreader 3 positioned within the dowel sleeve. As viewed in the drawing, the lower end of the dowel sleeve 2 is its leading end and the upper end is its trailing end, that is when the dowel is inserted into a borehole in a receiving material the lower end or leading end is inserted first.

At the trailing end of the dowel sleeve 2, its exterior surface has a frusto-conically shaped portion 2a widening toward the trailing end. The sleeve 2 has a continuous bore extending from the trailing to the leading end and the spreading action on the dowel sleeve is achieved by the spreader 3 located within the forward portion of the bore. The spreader 3 has a frusto-conically shaped configuration for the forward portion of its surface in contact with the surface of the bore. Rearwardly of its frusto-conically shaped surface, the spreader has a cylindrically shaped surface. A female thread 2c is formed in the bore extending from the trailing end toward the leading end. The female thread is arranged to receive a fastening screw. At the other end of the dowel the surface of the bore has a frusto-conical configuration tapering or converging inwardly toward the leading end of the bore. In addition, the forward half of the dowel sleeve 2 has axially extending slots 4 which facilitate the spreading of the dowel sleeve when the spreader 3 is driven toward the leading end of the dowel. In other words, the spreading range of the dowel roughly coincides with that portion of the dowel sleeve containing the slots 4.

On the exterior of the dowel sleeve, extending from its leading end, the sleeve surface is tapered for a portion of the axial length containing the slots 4. As indicated in the drawings, the tapered portion is provided by a recessed portion 5 having a smaller diameter than the remainder of the exterior surface of the sleeve which extends rearwardly to the tapered end portion at the trailing end of the sleeve. While the tapered portion at the leading end of the sleeve is shown as the recessed portion 5 it could also be provided by a conically tapered portion.

While specific embodiments of the invention have been shown and described in detail to illustrate the application of the inventive principles, it will be understood that the invention may be embodied otherwise without departing from such principles.

What is claimed is:

1. A straddling dowel comprising a metallic sleeve having a leading end, which is inserted first into a borehole formed to receive the dowel, and a trailing end and forming a continuous bore extending between the leading and trailing ends, said sleeve having a spreading range extending rearwardly from its leading end so that said sleeve can be spread radially outwardly and anchored to the surface of the borehole, said sleeve having slots extending in the axial direction for a portion of its length from the leading end and the axial length of said slots approximately determining the axial length of the spreading range of said metallic sleeve, and a spreader insertable into the continuous bore from the trailing end and displaceable within the bore toward the leading end for effecting the spreading action, wherein the improvement comprises that the surface of the continuous bore is tapered in a frusto-conical shape for an axially extending portion thereof from the leading end with said tapered surface diverging in the direction of the trailing end and terminating adjacent to and spaced forwardly of the trailing ends of said slots, the outer surface of said sleeve in its spreading range from the leading end presenting a smooth rounded surface in the circumferential direction, said spreader having a frusto-conically shaped, axially extending portion extending rearwardly from its end which is located closer to the leading end of the bore and which effects the spreading action within the spreading range of said sleeve, the frusto-conically shaped portion of said spreader corresponding to the frusto-conically shaped tapered portion of said bore at the trailing end thereof so that the frusto-conically shaped portion of said spreader seats in closely fitting surface contact with the correspondingly shaped surface of said bore before it is driven forwardly through the tapered surface of said bore, the axial length of the frusto-conically shaped portion of said spreader being a fractional part of the axial length of said tapered surface at the leading end of the said bore so that prior to driving said spreader forwardly toward the leading end for effecting the spreading action, its end closer to the leading end to the bore is spaced rearwardly from the leading end, the outer surface of said sleeve for an intermediate portion thereof spaced from its leading and trailing ends and extending into the spreading range has a cylindrically shaped surface, the forward end of the outer surface of said sleeve between the leading end and the cylindrically shaped surface of said intermediate portion being spaced radially inwardly from a projection of the cylindrically shaped surface and having a minimum diameter such that the leading end is not widened to more than the diameter of the bore hole upon completion of the spreading action, and the axial length of the forward end of the outer surface being not greater than the axial distance which the end of said spreader located closer to the leading end of said sleeve is spaced rearwardly from the leading end when it is in position in contact with the tapered surface therein and before it is driven forwardly toward the leading end, and the plane of the surface of the forward end of said sleeve spaced radially inwardly of the projection of the cylindrically shaped portion is, at its junction with the cylindrically shaped portion, disposed angularly relative to the cylindrically shaped portion.

2. A straddling dowel, as set forth in claim 1, wherein the inwardly spaced outer surface of said sleeve extending rearwardly from its leading end is frusto-conically shaped and tapers inwardly toward the leading end thereof.

3. A straddling dowel, as set forth in claim 1, wherein the outer surface of said sleeve extending in the axial direction from its trailing end to the intermediate portion of the outer surface has a frusto-conical shape widening toward the trailing end.

4. A straddling dowel, as set forth in claim 3, wherein a female thread being formed in the bore of said sleeve extending from the trailing end thereof toward the leading end, and the axial length of the frusto-conically shaped portion of the outer portion of said sleeve extending from its trailing end being less than the axial length of said female thread within the bore.

* * * * *